Oct. 27, 1925.
C. L. HOBBS
RIM
Filed Feb. 5, 1924
1,558,611
3 Sheets-Sheet 1
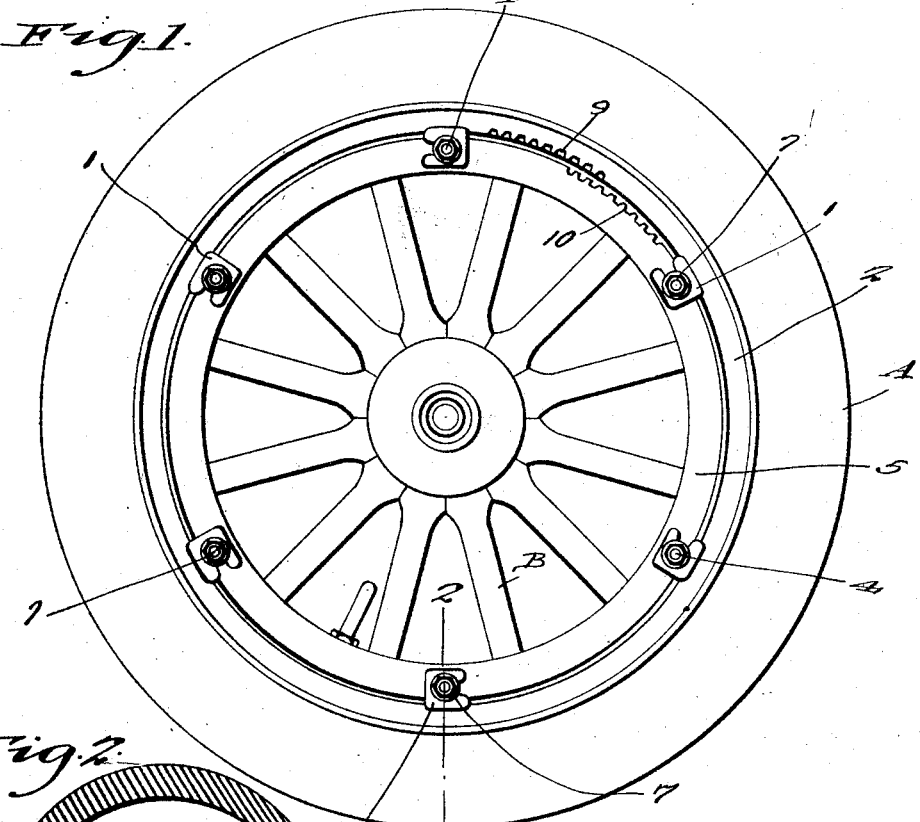
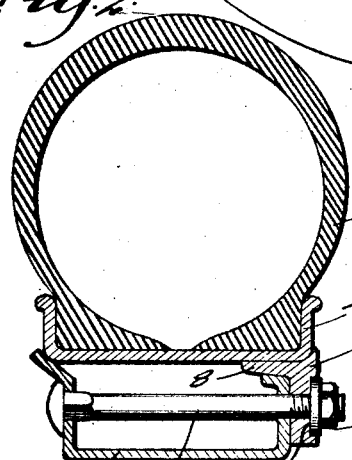
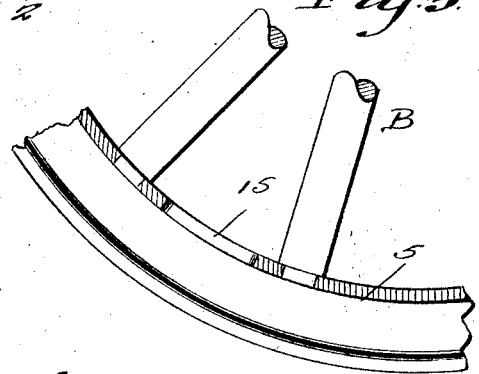
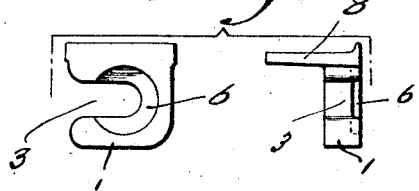
Witnesses
R. Q. Thomas
Inventor
C L Hobbs
Victor J. Evans
Attorney Oct. 27, 1925.  
C. L. HOBBS  
RIM  
Filed Feb. 5, 1924    3 Sheets-Sheet 2

1,558,611

Witnesses  
R. A. Thomas

Inventor  
C. L. Hobbs  
Victor J. Evans  
Attorney

Oct. 27, 1925. 1,558,611
C. L. HOBBS
RIM
Filed Feb. 5, 1924   3 Sheets-Sheet 3
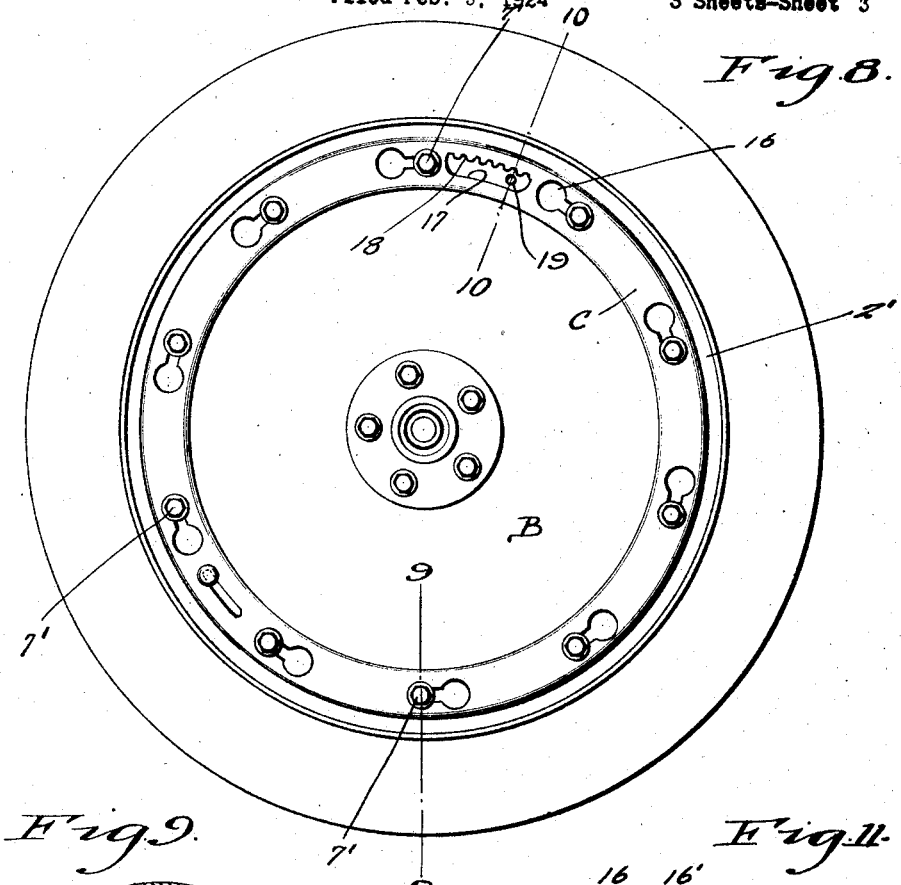
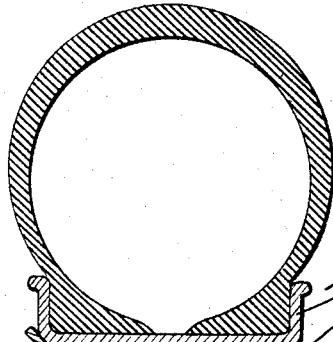
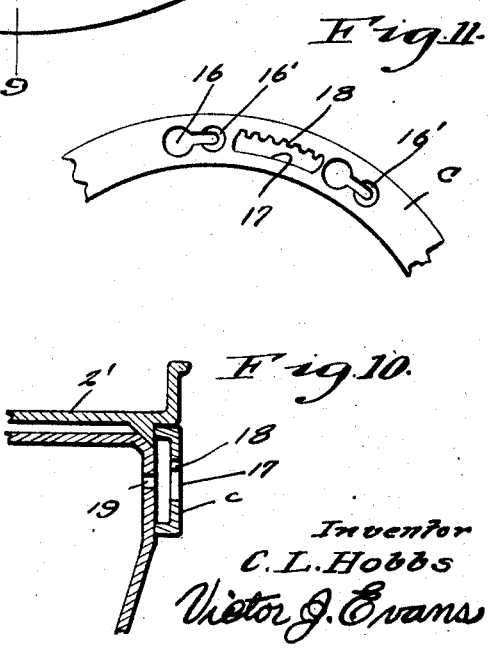
Witnesses
R. A. Thomas
Inventor
C. L. Hobbs
Victor J. Evans
Attorney

Patented Oct. 27, 1925.

1,558,611

UNITED STATES PATENT OFFICE.

CHARLES L. HOBBS, OF TULSA, OKLAHOMA.

RIM.

Application filed February 5, 1924. Serial No. 690,846.

*To all whom it may concern:*

Be it known that I, CHARLES L. HOBBS, a citizen of the United States, residing at Tulsa, in the county of Tulsa and State of Oklahoma, have invented new and useful Improvements in Rims, of which the following is a specification.

This invention relates to means for fastening a tire rim to a wheel, the general object of the invention being to provide means whereby the rim can be removed from the wheel without entirely removing the nuts from the bolts which fasten the rim to the wheel so that the rim can be easily and quickly removed from the wheel or replaced thereon.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a wheel supplied with my invention.

Figure 2 is a section on line 2—2 of Figure 1.

Figure 3 is a fragmentary sectional view showing the slot for the valve stem.

Figure 6 shows one of the lugs in elevation and end view.

Figure 8 is an elevation showing the invention applied to a disc wheel.

Figure 9 is a section on line 9—9 of Figure 8.

Figure 10 is a section on line 10—10 of Figure 8 with the tire removed.

Figure 11 is a view of a portion of the attaching ring.

Figure 4:
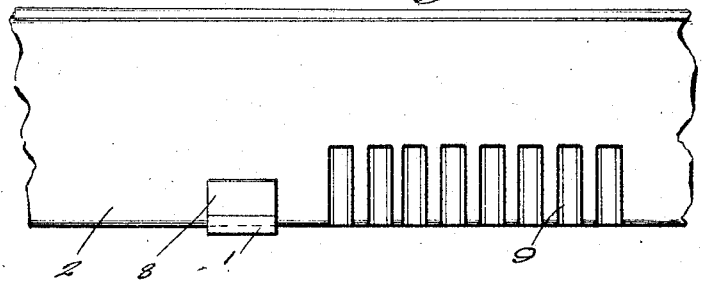
Figure 4 is a view of the toothed portion of the rim.
Figure 5:
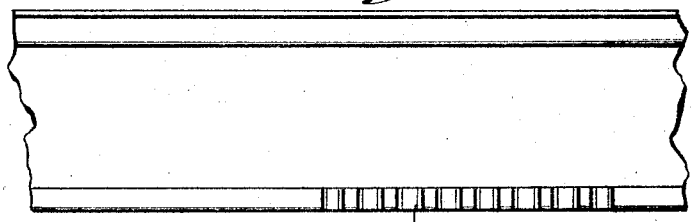
Figure 5 is a similar view of the toothed portion of the felly.
Figure 7:
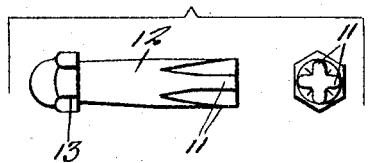
Figure 7 shows a tool used for rotating the rim on the wheel.
Figure 12:
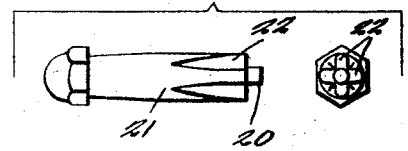
Figure 12 shows a tool for rotating this ring.

Referring to the first form of the invention, the lugs 1 are welded or otherwise connected with the rim 2 which supports the tire A. Each of these lugs has an open ended slot 3 therein for engaging the bolt 4 which passes through the channel-shaped felly 5 of the wheel B. Each lug is also provided with a recess 6 for receiving the nut 7 of the bolt 4 and each lug is provided with a wedge-shaped projection 8 which engages the outer flange of the felly 5.

Figure 13:
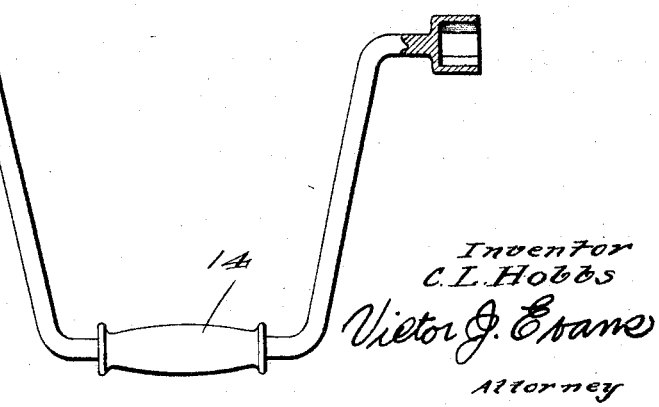
Figure 13 is a view of the brace used for turning the nuts and the tools.

From the foregoing it will be seen that it is simply necessary to loosen the nuts and then give the rim 2 a slight rotary movement to cause the lugs to pass from under the nuts and to leave the bolts so that the rim can be removed from the wheel. By means of the recesses 6 in the lugs the parts are firmly held against movement when the nuts are screwed home and said nuts must be moved a sufficient distance to clear the raised portions of the lugs adjacent the mouth of the slot in each lug before the rim can be rotated. In order to give the rim this rotary movement I form ratchet teeth 9 in a portion of the rim and similar teeth 10 in a portion of the felly for receiving the wings 11 of a tool 12 which has its head 13 formed to enter the socket of the brace 14 which is used to turn the nuts 7 on the bolts 4. Thus by placing the tool in engagement with the teeth 9 and 10 and then rotating it by the brace the rim is rotated on the wheel so as to place the lugs into engagement with the bolts or to remove them out of engagement with the bolts. In order to permit this movement of the rim on the wheel a slot 15 is made in the felly to receive the valve stem of the tire so that said stem will not interfere with the rotary movement of the rim.

Where the invention is to be used on a disc wheel the attaching ring C for holding the rim 2' to the disc wheel B is formed with key-hole shaped slots 16 for receiving the bolts 4' and the small ends of these slots are provided with recesses 16' for receiving the nuts 7'. The large ends of the slots are of sufficient diameter to permit the nuts to pass through them so that the rim can be put in place or removed from the wheel. A slot 17 is formed in the ring with one edge provided with the ratchet teeth 18 and a hole 19 is formed in a part of the wheel to receive a projection 20 on a tool 21 which is formed with the wings 22 for engaging the teeth 18. This tool 21 is adapted to be actuated by a brace similar to that shown in Figure 13.

Thus it will be seen that the ring is partially rotated to place the bolts in engagement with the large or small ends of the slots and when the bolts engage the small ends of the slots and the nuts are screwed home in the recesses 16' the ring is firmly locked to the wheel and thus will hold the rim and tire in position thereon.

My invention provides means whereby a tire and its rim can be easily and quickly removed from a wheel or placed thereon as it is not necessary to entirely remove the nuts from the bolts as these nuts need but be loosened sufficiently to raise them above the recesses. The tool and the racks provide means for facilitating the rotary movement of the parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a wheel and its demountable rim, bolts passing through the felly of the wheel with their screw threaded portions projecting from the outer face of the felly, lugs connected with the rim and extending inwardly and each lug having a slot therein opening out through one side thereof and each lug having a recess in its outer face which has the inner end of the slot in its bottom and nuts engaging the threaded ends of the bolts, each nut having a flat under face for engaging a recess in the lug and said slots permitting removal of the rim upon a relative rotation thereof when the nuts have been removed sufficiently to clear said recesses.

In testimony whereof I affix my signature.

CHARLES L. HOBBS.